(12) United States Patent
Maehiro (10) Patent No.: US 7,878,904 B2
(45) Date of Patent: Feb. 1, 2011

(54) OBJECT SELECTING METHOD

(75) Inventor: Kazutoyo Maehiro, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 447 days.

(21) Appl. No.: 11/039,803

(22) Filed: Jan. 24, 2005

(65) Prior Publication Data

US 2005/0192096 A1 Sep. 1, 2005

(30) Foreign Application Priority Data

Jan. 23, 2004 (JP) ............................ P2004-015318

(51) Int. Cl.
- *A63F 9/24* (2006.01)
- *A63F 13/00* (2006.01)
- *G06F 17/00* (2006.01)
- *G06F 19/00* (2006.01)

(52) U.S. Cl. ...................................................... 463/37

(58) Field of Classification Search .................. 463/36, 463/37, 38
See application file for complete search history.

(56) References Cited

U.S. PATENT DOCUMENTS

| | | | | |
|---|---|---|---|---|
| 5,807,174 A * | 9/1998 | Fukuhara et al. | .............. | 463/31 |
| 6,117,014 A * | 9/2000 | Aoyama et al. | .............. | 463/43 |
| 6,152,821 A * | 11/2000 | Nakagawa et al. | ............. | 463/4 |
| 6,200,138 B1 * | 3/2001 | Ando et al. | ................... | 434/61 |
| 6,283,854 B1 * | 9/2001 | Niwa | .............................. | 463/7 |
| 6,283,861 B1 * | 9/2001 | Kawai et al. | .................. | 463/43 |
| 6,371,856 B1 * | 4/2002 | Niwa | ............................ | 463/43 |
| 2003/0016253 A1 * | 1/2003 | Aoki et al. | .................. | 345/863 |

FOREIGN PATENT DOCUMENTS

| | | |
|---|---|---|
| JP | 11-128533 | 5/1999 |
| JP | 2003-107990 | 4/2003 |

OTHER PUBLICATIONS

Squaresoft, "Final Fantasy VII", US release Sep. 7, 1997, screenshot.*

(Continued)

*Primary Examiner*—Dmitry Suhol
*Assistant Examiner*—Kevin Y Kim
(74) *Attorney, Agent, or Firm*—Greenblum & Bernstein P.L.C.

(57) ABSTRACT

When an upper part of a cross key is operated with a controller, a cursor is moved to an object name above an initial position where the cursor was located in a list, and an icon is moved to a corresponding object in an object display area. When a lower part of the cross key is operated, the cursor is moved to an object name below the initial position, and the icon is moved to the corresponding object in the object display area. When a right part of the cross key is operated, the icon is moved to the object to the right of an initial position where the icon was in the object display area, and the cursor is moved to the corresponding object name in the list. When a left part of the cross key is operated, the icon is moved to the object to the left of the initial position in the object display area, and the cursor is moved to the corresponding object name in the list.

21 Claims, 8 Drawing Sheets

OTHER PUBLICATIONS

Sega, "Crazy Taxi", US release 1999, screenshot.*
Hal, "Super Smash Brothers Melee," US release Dec. 2, 2001, Nintendo, screenshot.*
"Final Fantasy III/VI," Apr. 2, 1994, Square, screenshot.*
"Final Fantasy VIII," Sep. 9, 1999, Square, screenshot.*
English Language Abstract of JP 11-128533.
English Language Abstract of JP 2003-107990.

* cited by examiner

| COMMAND NAME | LOWER-ORDER COMMAND NAME | INITIAL GROUP |
|---|---|---|
| BATTLE | - | EC |
| MAGIC | KEARU | PC |
| MAGIC | KEARUGA | PC |
| . | . | . |
| MAGIC | FIRE | EC |
| . | . | . |
| ITEM | PORTION | PC |
| . | . | . |
| DEFENCE | - | - |

FIG. 3B

| CHARACTER NAME | HP | HPMAX | MP | MPMAX | POSITION | SCREEN COORDINATE |
|---|---|---|---|---|---|---|
| PC1 | 50 | 100 | 1 | 10 | x1, y1, z1 | X1, Y1 |
| PC2 | 60 | 80 | 20 | 20 | x2, y2, z2 | X2, Y2 |
| PC3 | 20 | 75 | 40 | 40 | x3, y3, z3 | X3, Y3 |

FIG. 3C

| CHARACTER NAME | HP | HPMAX | MP | MPMAX | POSITION | SCREEN COORDINATE |
|---|---|---|---|---|---|---|
| EC1 | 100 | 100 | 10 | 10 | x4, y4, z4 | X4, Y4 |
| EC2 | 150 | 150 | 0 | 0 | x5, y5, z5 | X5, Y5 |
| . | . | . | . | . | . | . |

OBJECT SELECTING METHOD

CROSS REFERENCE TO RELATED APPLICATION

The present disclosure relates to subject matter contained in Japanese Patent Application No. 2004-015318, filed on Jan. 23, 2004, the disclosure of which is expressly incorporated herein by reference in its entirety.

BACKGROUND OF THE INVENTION

1. Field of the Invention

The present invention relates to a game apparatus for a video game that advances based upon an object selection by a user on a display screen. Furthermore, the present invention relates to an object selecting method and a recording medium on which is recorded an object selecting program.

2. Description of the Related Art

In conventional role playing games, a player operates an input apparatus such as a controller and the like to select a character to be attacked or to be an object of a magic spell or item, from multiple characters displayed on a screen of a display apparatus. For selecting a specific object from the multiple characters and the like displayed on the screen, a window is displayed apart from a game image area on a part of the screen. In the window, a cursor is displayed together with character names, etc. The cursor moves in response to an operation input by the player. Thus, the character and the like pointed to by the cursor serves as the object selected by the player. Another cursor may be displayed in the game image area. In the game image area, a character image corresponding to the character name pointed to by the cursor in the window may be pointed to by the other cursor.

In addition, a game apparatus was provided, in which an object (character) is selected in a priority order based upon a distance in the game image area (see Japanese Unexamined Patent Publication No. H11-128533, for example.)

When selecting the object in the game image area by selecting the character name displayed in the window, it is possible to select the exact object corresponding to the specified character name even if multiple characters are displayed close to one another in the game image area. In this case, however, the player has to grasp in advance the relationship between the image of the character that the player is to select and the character name. Alternatively, the player has to select the character name in the window using the cursor while confirming the image pointed to by the other cursor in the game image area in accordance with the selected character name in order to judge whether the desired object is selected. Thus, a heavy burden rests on the player when selecting the object, and the user cannot easily select the object.

In another case, the player may move the cursor in the game image area to select the image in the game image area. In this case, it is not necessary for the player to know the relationship between the desired character and the character name, thus, the burden on the player should be reduced. In this case, however, it is difficult for the player to select the exact character from the multiple characters displayed close to one another using the cursor, and thereby to select the desired object without fail.

Thus, both cases have advantages and disadvantages, and the player cannot easily and exactly select the desired object.

SUMMARY OF THE INVENTION

The present invention is made in view of these problems. It is an object of the present invention to provide a game apparatus, a recording medium with a video game program recorded thereon and a character movement control method in the video game, which enable a user to easily and exactly select a desired object based upon a game status at the time of the selection and a level of user's understanding about the object.

In order to achieve the objects, according to a first aspect of the invention, there is provided a game apparatus having first and second operating systems that receive operations input by a user. The game apparatus further includes a list display controller that displays a list of object names to be selected on a predetermined display system. The game apparatus further includes an object display controller that displays an object display area where objects are displayed on the display system. The game apparatus further includes a first selection display controller that selects any one of the object names from the list in response to the first operation input to the first operating system. In addition, the first selection display controller displays the object corresponding to the selected object name in a form indicating the object is selected when the object corresponding to the selected object name is displayed in the object display area. The game apparatus further includes a second selection display controller that selects any one of the objects displayed in the object display area in response to the operation input to the second operating system. In addition, the second selection display controller displays the object name corresponding to the selected object in the list in a form indicating the name is selected.

Thus, when the user of the game apparatus operates the first operating system, one of the object names in the list is selected, and the object corresponding to the selected object name is displayed in the object display area in a form indicating that the object is selected. As a result, the user can select the object corresponding to a desired object name easily and exactly by operating the first operating system even if multiple objects are displayed close to one another in the object display area.

When the user operates the second operating system, one of the objects displayed in the object display area is selected, and the object name corresponding to the selected object is displayed in the list in a form indicating that the name is selected. Thus, it is not necessary for the user to grasp the relationship between the object that the user wants to select and the object name. That is, the user can easily select the desired object by operating the second operating system without grasping the exact relationship therebetween.

In another embodiment, the first selection display controller selects any one of the object names in the list based upon a display order in response to the first operation input to the first operating system. Thus, the object names are sequentially selected one by one in the list every time the user operates the first operating system.

In another embodiment, the second selection display controller selects the object based upon a positional relationship between the objects to be displayed in the object display area. Thus, the objects are sequentially selected one by one every time the user operates the second operating system.

In yet another embodiment, the game apparatus further includes a determining system that determines whether there is the object corresponding to the object name selected in response to the first operation input to the first operating system in the object display area. In addition, the first display controller further includes a system that indicates a direction where the object corresponding to the selected name virtually exists in a game when the determining system determines that there is no object corresponding to the selected object name in the object display area. Thus, the user can recognize that the object corresponding to the object name selected by the user using the first operating system is not present in the object display area. At the same time, the user can recognize in which direction the object corresponding to the object name virtually exists at the present point of time of the game.

In still another embodiment, the objects to be selected are divided into multiple groups depending on type. The game apparatus includes a third operating system that receives the operation input by the user. The game apparatus further includes a group selection controller that selects the group in response to the operation input to the third operation system. In this embodiment, the first selection display controller selects, from the selected group, the object name in response to the first operation input to the first operating system. Furthermore, the second selection display controller selects, from the selected group, the object in response to the second operation input to the second operating system. Thus, the selections based upon the operations input to the first and second operating systems are made with respect to every group selected in response to the operation input to the third operating system.

In still another embodiment, the groups include at least a group of a user controlled character and corresponding friendly objects and a group of enemy objects. Thus, the selections based upon the operations input to the first and second operating systems are made with respect to the group of user controlled characters and corresponding objects or the group of enemy objects.

In yet another embodiment, the first operating system is positioned on a first line having two ends, and receives a direction corresponding to one of the ends operated by the user. The first selection display controller selects the object name based upon the direction received by the first operating system. The second operating system is positioned on a second line extending in a direction different from the first line and also having two ends, and receives a direction corresponding to one of the ends operated by the user. The second selection display controller selects the object based upon the direction received by the second operating system. Thus, the user can select the desired name in the list and the desired object displayed in the object display area easily by selecting any one of the ends of the operating systems.

Furthermore, the first and second lines intersect at right angles to one another. That is, the first and second operating systems may be implemented with a so-called cross key.

In still another embodiment, the first and second operating systems are constructed by an operating part. The operating part is positioned within a range in which the user can operate the operating part with a predetermined finger of one hand when the user's hand is located at a predetermined position. Thus, the user can operate the first and second operating system with a predetermined finger, for example, a thumb, of his/her hand while the hand is positioned at a predetermined position. As a result, the user can make the selection easily and quickly.

According to a second aspect of the present invention, there is provided an object selecting method executed by a computer of a game apparatus having first and second operating systems that receive input from a user. The computer is caused to display a list containing object names to be selected on a predetermined display system. The computer also displays an object display area where objects are displayed on the display system. The method further includes selecting any one of the object names from the list in response to a first operation input to the first operating system. The method also includes displaying the object corresponding to the selected object name in a form indicating the object is selected when the object corresponding to the selected object name is displayed in the object display area. The method further includes selecting one of the objects from the objects displayed in the object display area in response to a second operation input to the second operating system. Finally, the method includes displaying the object name corresponding to the selected object in the list in a form indicating the name is selected.

In another embodiment, the object name is selected based upon a display order in response to the operation input to the first operating system.

In still another embodiment, the object is selected based upon a positional relationship between the objects to be selected displayed in the object display area.

In still another embodiment, the method also includes determining whether the object corresponding to the object name selected in response to the operation input to the first operating system is located in the object display area. The method includes displaying a direction where the object corresponding to the selected name virtually exists in a game when it is determined that there is no object corresponding to the selected object name in the object display area.

In yet another embodiment, the objects to be selected are divided into multiple groups depending on types. In this embodiment, the method further includes selecting the group in response to a third operation input to a third operation system that receives input by the user. The method includes selecting the object name in response to the operation input to the first operating system from the selected group. In addition, the method selects the object in response to the operation input to the second operating system from the selected group.

Furthermore, the groups include at least a group of user controlled characters and the corresponding friendly objects and a group of enemy objects.

In still another embodiment, the first operating system is positioned on a first line having two ends, and receives a direction corresponding to one of the ends operated by the user. Furthermore, the object name is selected based upon the direction received by the first operating system. The second operating system is positioned on a second line extending in a direction different from the first line and having two ends, and receives a direction corresponding to one of the ends operated by the user. Furthermore, the object is selected based upon the direction received by the second operating system.

In still another embodiment, the first and second lines intersect at right angles to one another.

In yet another embodiment, the first and second operating systems are constructed by an operating part. The operating part is positioned within a range in which the user can operate the operating part with a predetermined single finger of one hand when the user's hand is positioned at a predetermined position.

The effects according to the first aspect of the present invention are achieved by causing the computer to execute the above-mentioned processing.

According to a third aspect of the present invention, there is provided a recording medium on which is recorded a program executed by a computer of a game apparatus. The game apparatus includes first and second operating systems that receive input from a user. The program causes the computer to display a list containing object names to be selected on a predetermined display system. The program further causes a computer to display an object display area where objects are displayed on the display system. The program further causes the computer to select any one of the object names from the list in response to a first operation input to the first operating system. The program further causes the computer to display the object corresponding to the selected object name in a form indicating the object is selected when the object corresponding to the selected object name is displayed in the object display area. The program further causes the computer to select any one of objects from the objects displayed in the object display area in response to a second operation input to the second operating system. The program further causes the computer to display the object name corresponding to the selected object in the list in a form indicating the name is selected.

In another embodiment, the object name is selected based upon a display order in response to the operation input to the first operating system.

In still another embodiment, the object is selected based upon a positional relationship between the objects to be selected displayed in the object display area.

In yet another embodiment, the program further causes the computer to determine whether the object corresponding to the object name selected in response to the operation input to the first operating system is located within the object display area. The program further causes the computer to indicate a direction where the object corresponding to the selected name virtually exists in a game when it is determined that there is no object corresponding to the selected object name in the object display area.

In still another embodiment, the objects to be selected are divided into multiple groups depending on types. In this embodiment, the program further causes the computer to select the group in response to a third operation input to a third operation system that receives input from the user. The program further causes the computer to select, from the selected group, the object name in response to the operation input to the first operating system. The program further causes the computer to select the object, from the selected group, in response to the operation input to the second operating system.

Furthermore, the groups include at least a group of a user controlled character and corresponding friendly objects and a group of enemy objects.

In still another embodiment, the first operating system is positioned on a first line having two ends, and receives a direction corresponding to one of the ends operated by the user. The object name is selected based upon the direction received by the first operating system. Furthermore, the second operating system is positioned on a second line extending in a direction different from the first line and having two ends, and receives a direction corresponding to one of the ends operated by the user. The object is selected based upon the direction received by the second operating system.

Furthermore, the first and second lines intersect at right angles to one another.

In yet another embodiment, the first and second operating systems are constructed by an operating part. The operating part is positioned within a range in which the user can operate the operating part with a predetermined single finger of a hand when the user's hand is positioned at a predetermined position.

The effects according to the first aspect of the present invention are achieved by causing the computer to execute the above-mentioned processing according to the program recorded on the recording medium.

As described so far, when the user of the game apparatus operates the first operating system, the object name is selected in the list containing the selectable object names. In addition, the object corresponding to the selected object name is displayed in the object display area in a form indicating that the object is selected. Thus, the user can exactly select the desired character by operating the first operating system when the objects to be selected are displayed close to one another in the object display area.

The user operates the second operating system to select one of the objects displayed in the object display area. In addition, the object name corresponding to the selected object is displayed in the list in the form indicating that the object is selected. Thus, the user does not need to grasp the relationship between the desired object and the object name. That is, the user can easily and precisely select the desired object by using the second operating system without grasping the relationship.

Thus, the user can easily and properly select the desired object depending upon a game status and the level of the user's understanding about the objects to be selected by operating the first and second operating systems.

DETAILED DESCRIPTION OF THE PREFERRED EMBODIMENTS

Preferred embodiments of the invention will be explained in detail with reference to the appended drawings. A home-use game device is applied in the embodiments hereinafter as an example.

Figure 1:
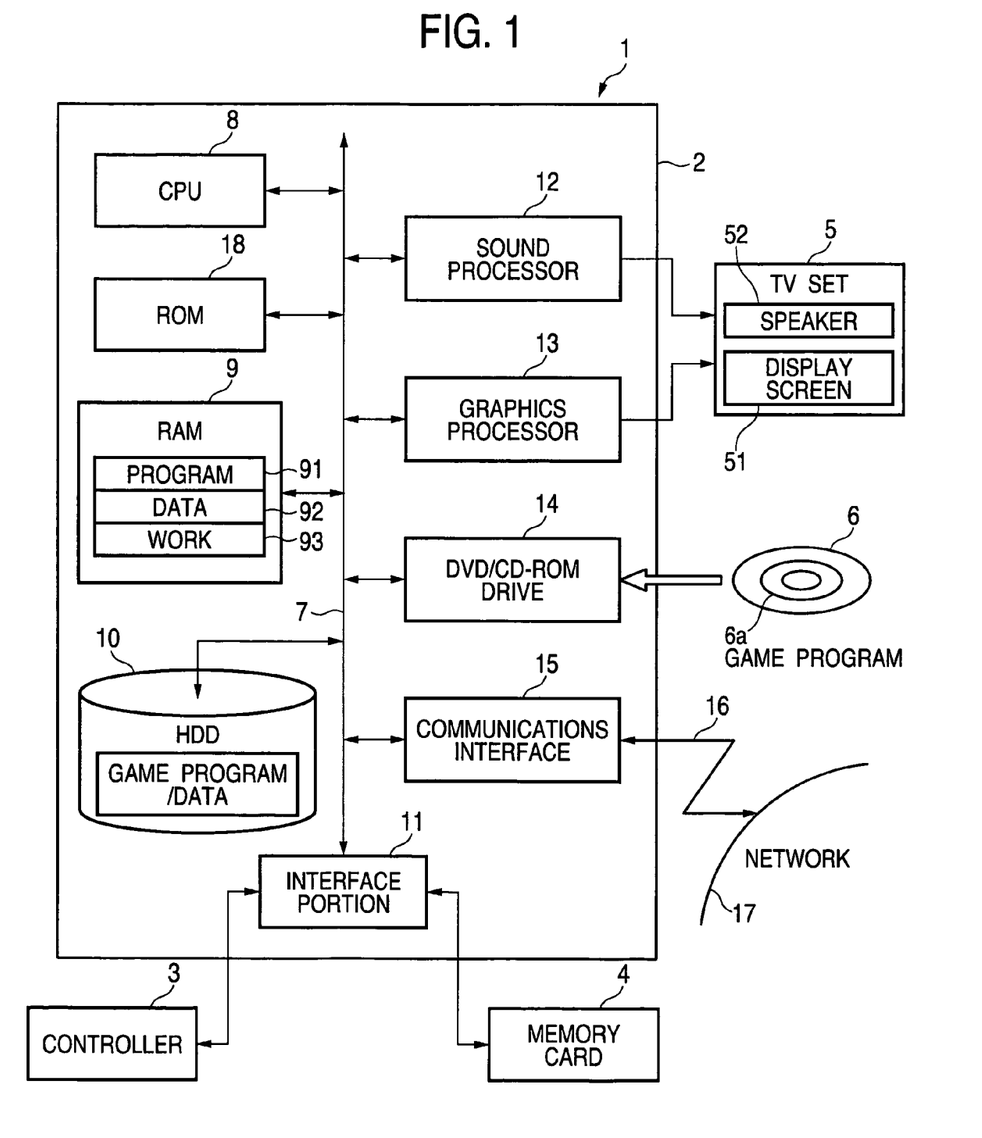
FIG. 1 is a block diagram showing a structure of a game apparatus according to an embodiment of the invention.

FIG. 1 is a block diagram showing a structure of a game apparatus according to an embodiment of the invention. A game apparatus 1 includes a game machine main body 2, a controller 3, a memory card 4, a television (TV) set 5, and a digital versatile disc-read only memory (DVD-ROM) 6.

The game machine main body 2 includes a central processing unit (CPU) 8, a read only memory (ROM) 18, a random access memory (RAM) 9, a hard disk drive (HDD) 10, and an interface portion 11. The game machine main body 2 further includes a sound processor 12, a graphics processor 13, and a digital versatile disc/compact disc read only memory (DVD/

CD-ROM) drive 14, a removable DVD-ROM 6, and a communications interface 15. All of the components are connected via a bus 7.

The CPU 8 executes a program stored in the RAM 9 sequentially based upon a basic program such as a boot program or an operating system (OS), etc., stored in the ROM 18 to advance a game. The CPU 8 controls the operation of the respective components 9-15.

The RAM 9 serves as a main memory of the game machine main body 2. The RAM 9 stores programs or data necessary for advancing the game, which programs or data are transferred from the DVD-ROM 6. The RAM 9 also serves as a work area when the program is executed. That is, a program storage area 91, a data storage area 92, a work area 93 and the like are allocated to the RAM 9. The DVD/CD-ROM drive 14 reads the programs or data stored in the program storage area 91 and the data storage area 92 from the DVD-ROM 6 in accordance with the control by the CPU 8. The DVD/CD-ROM 14 transfers the data or programs to the RAM 9. The work area 93 temporarily stores various kinds of data necessary in the game progress.

The HDD 10 stores a game program and data acquired from an outside network 17 via the communications interface 15 and a communications line 16. The controller 3 and the memory card 4 are detachably connected to the interface portion 11. The interface portion 11 controls the exchange of data between the controller 3 and the memory card 4 and the CPU 8 and the RAM 9. The controller 3 includes direction keys and various buttons. A player operates these keys and buttons to input instructions to a player character for advancing the game. The memory card 4 stores data indicating the game progress status.

The sound processor 12 executes the processing for reproducing sound data including background music, sound effects and the like in accordance with the game progress as instructed by the CPU 8. Then, the sound processor 12 outputs a sound signal to the TV set 5.

The graphics processor 13 executes the three-dimensional graphics processing as instructed by the CPU 8 to generate image data in accordance with the game progress status. The graphics processor 13 adds a predetermined synchronizing signal to the generated image data. Then, the graphics processor 13 outputs the image data and the synchronizing signal to the TV set 5 as a video signal.

The DVD/CD-ROM drive 14 drives the DVD-ROM 6 provided with the game machine main body 2 as instructed by the CPU 8. Then, the DVD/CD-ROM drive 14 transfers programs or data stored in the DVD-ROM 6 to the RAM 9 via the bus 7.

The communications interface 15 is connected to the outside network 17 via the communication lines 16, and receives/transmits data from/to the outside network 17.

The DVD-ROM 6 stores a game program 6a including programs or data necessary for advancing the game. The DVD/CD-ROM drive 14 drives the DVD-ROM 6 to read the program or data stored in the DVD-ROM 6. The data or program read from the DVD-ROM 6 are transferred from the DVD/CD-ROM drive 14 to the RAM 9 via the bus 7.

The TV set 5 includes a display screen 51 constituted by a cathode ray tube (CRT) and the like, which displays images corresponding to the video signal output from the graphics processor 13. The TV set further includes a speaker (not shown) for outputting sounds corresponding to the sound signal from the sound processor 12. A television receiver is generally used as the TV set 5.

Figure 2A:
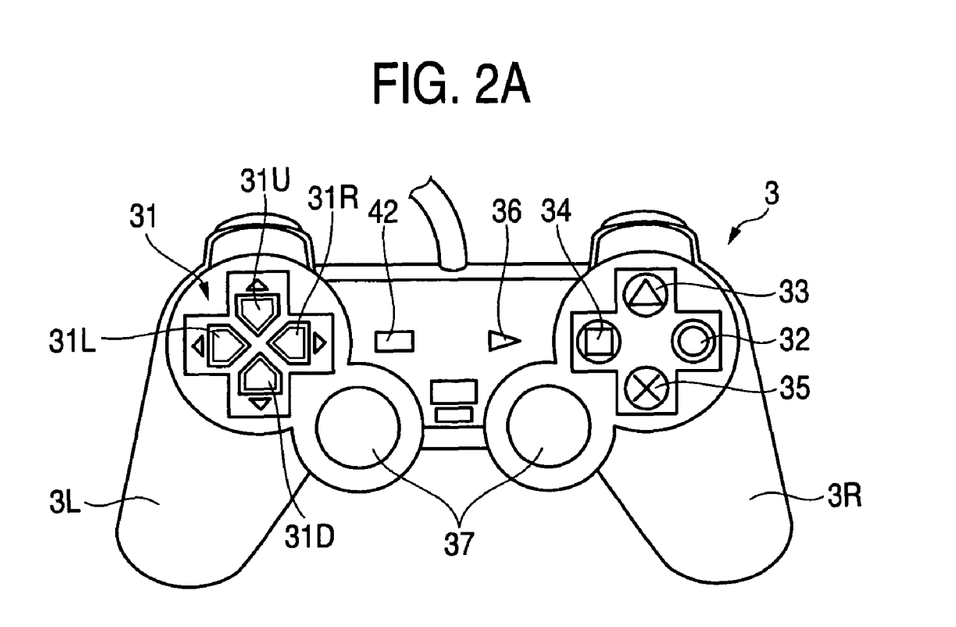
FIG. 2A is a plan view showing a controller according to an embodiment of the invention.
Figure 2B:
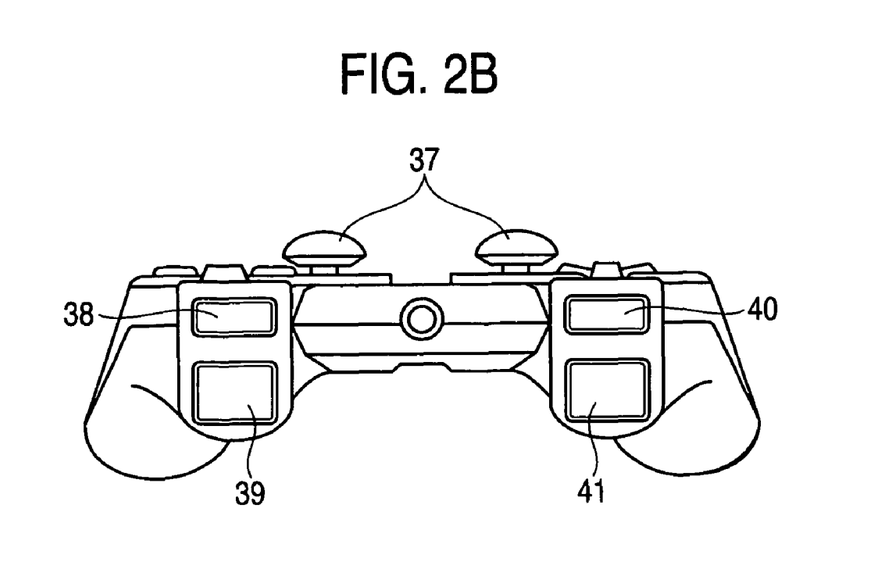
FIG. 2B is a rear view showing a controller according to an embodiment of the invention.

FIG. 2A is a plan view showing the controller 3. FIG. 2B is a rear view showing the controller 3. A left holding portion 3L and a right holding portion 3R, which are held by left and right hands, respectively, project from the controller 3. On the upper surface of the controller 3, there is provided a cross key 31 and operation keys for inputting various instructions to the CPU 8. The operation keys include a circle button 32, a triangle button 33, a square button 34, an X-button 35, a start button 36 and a select button 42. The cross key 31 is constituted by an upper part 31U and a lower part 31D, which are positioned on a single straight line. The cross key is further constituted by a left part 31L and a right part 31R, which are positioned on another straight line that intersects at right angles with the straight line on which the upper part 31U and the lower part 31D are positioned. All of the upper part 31U, the lower part 31D, the left part 31L and the right part 31R are positioned within a range that enables the player to operated these parts with his/her thumb of the left hand while the user holds the left holding part 3L.

The controller 3 is further provided with joysticks 37. In addition, on the back of the controller 3, there are provided multiple operation keys, such as an R1 button 38, an R2 button 39, a L1 button 40 and a L2 button 41. Furthermore, the controller 3 includes a built-in motor. The motor is activated by a predetermined control signal from the CPU, and vibrates the controller.

Figures 3A, 3B:
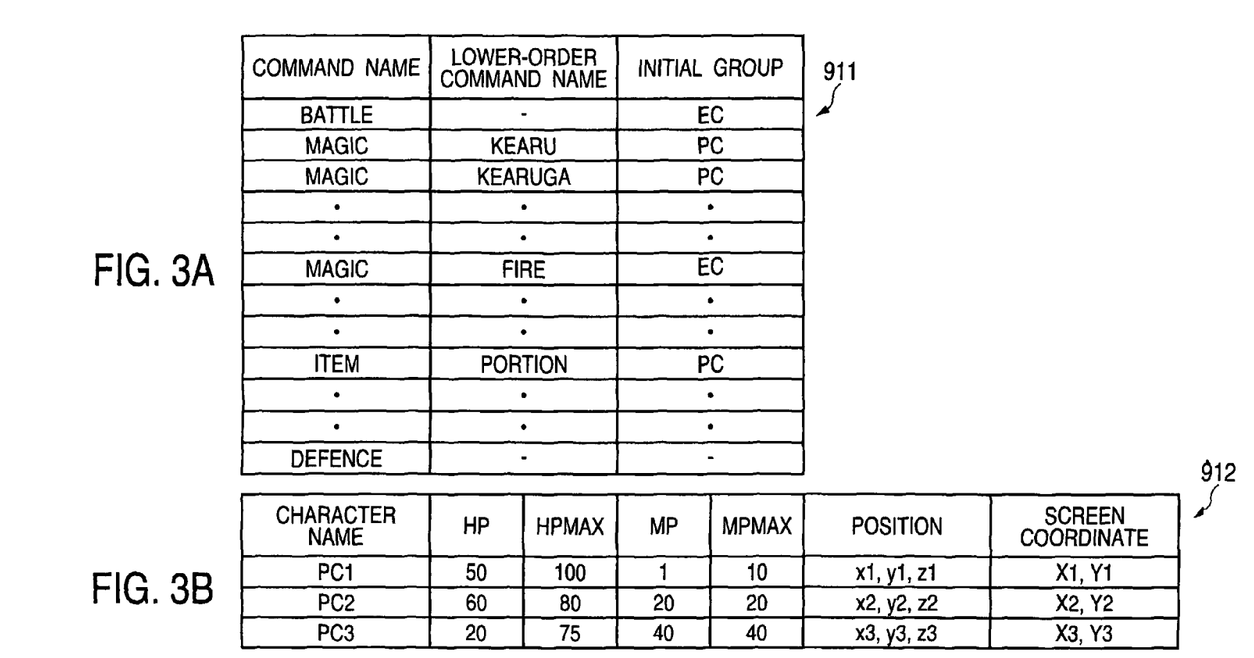
FIG. 3A is a conceptual diagram showing a command table according to an embodiment of the invention.
FIG. 3B is a conceptual diagram showing a player character table according to an embodiment of the invention.
Figure 3C:
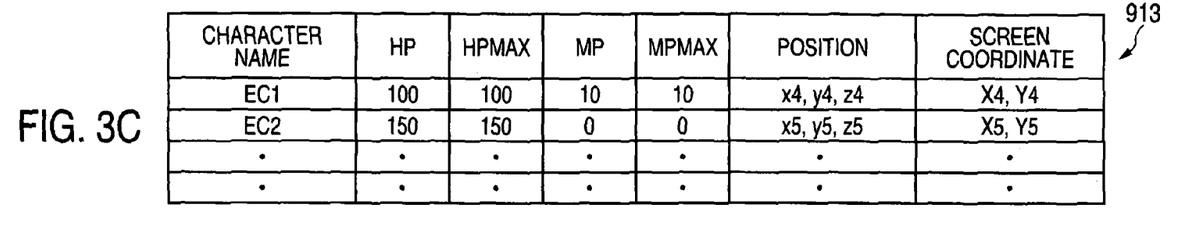
FIG. 3C is a conceptual diagram showing an enemy character table according to an embodiment of the invention.

In this embodiment, the CPU 8 allocates an area for storing information in the RAM 9, when the game starts. That is, the program storage area 91, the data storage area 92 and the work area 93 are provided in the RAM 9. When the request for starting the game is issued, information necessary for the game is read from the DVD-ROM 6 to the RAM 9. Thus, the game program and a command table 911 shown in FIG. 3A, which is included in the game program, is stored in the program storage area 91. In addition, a player character (PC) table 912 shown in FIG. 3B and an enemy character (EC) table 913 shown in FIG. 3C are stored in the data storage area 92.

The command table contains command names such as "battle", "magic", "item", "defense" and the like. When the respective commands have low-order commands (i.e., subcommands), the command table further contains lower-order command names and initial groups. In this embodiment, the initial groups consist of an EC group and a PC group. The initial group consists of the characters that are likely to be selected when the associated command is selected. For example, the commands of "battle" or "magic" for battle are associated with the EC group, and the commands of "magic" for cure are associated with the PC group.

The PC table 912 and the EC table 913 contain a hit point (HP), a hit point maximum value (HPMAX), a magic point (MP), and a magic point maximum value (MPMAX) The PC table 912 and the EC table 913 further contain the data of a position at which the corresponding character is in a three-dimensional coordinate system and a screen coordinate system indicating the position at which the character is on the screen 51.

In the case where the player stops the game before finishing it, the data of the PC table 912 and the EC table 913 are stored in the memory card 4. Then, the data of the PC table 912 and the EC table 913 are read from the memory card when the player restarts the game.

Figure 4:
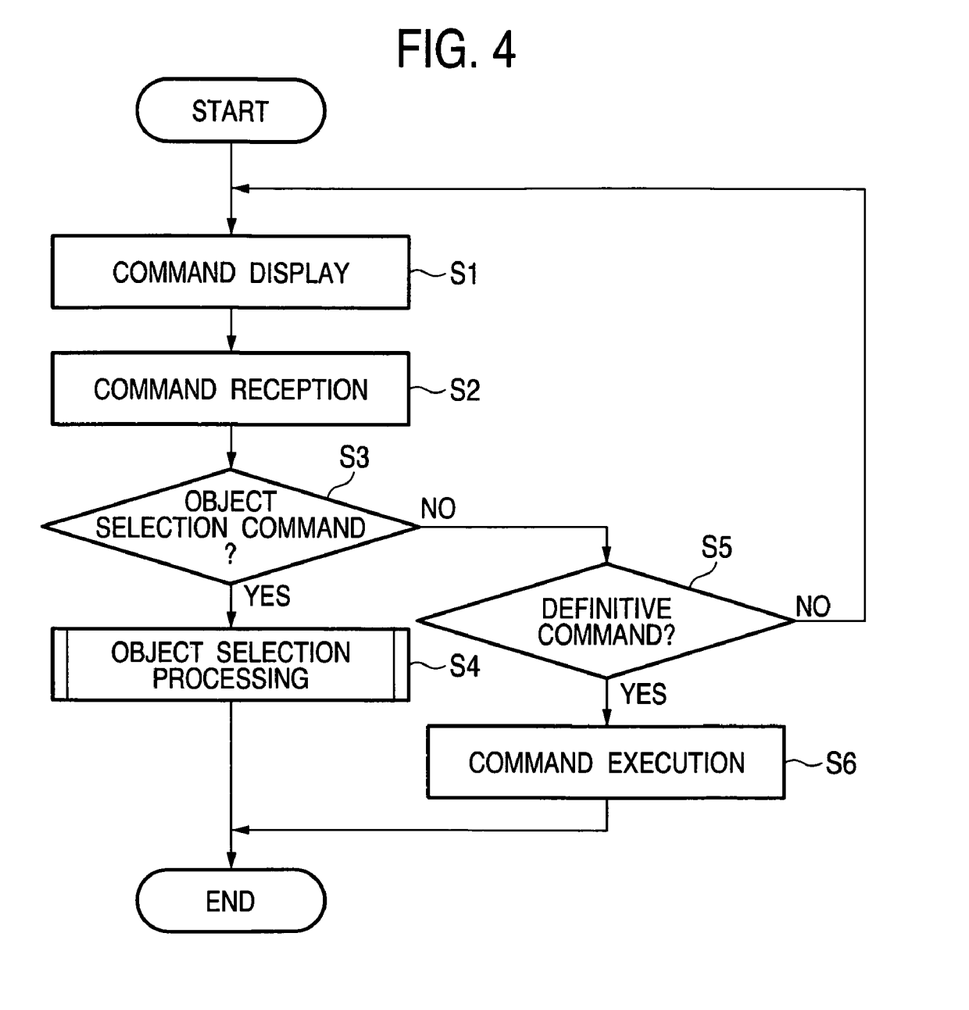
FIG. 4 is a flowchart showing a processing procedure according to an embodiment of the invention.

At the same time, the CPU 8 executes the processing shown in FIG. 4 in accordance with the game program stored in the program storage area 91. Firstly, the CPU 8 executes a command display processing to display the command names to be selected by the player such as the command names "battle", "magic", "item", "defense" and the like in the command table 911 on the display screen 51 (step S1). The player selects the desired command name from the command names displayed on the display screen 51 with the controller 3. Then, the CPU 8 executes a command reception processing to store the selected command name in the work area 93 in the RAM 9 (step S2).

Then, the CPU 8 judges whether an object (character, for example) of the command should be selected with respect to the selected command (step S3). If the object of the command needs to be selected with respect to the selected command (step S3; YES), the CPU 8 executes an object selection processing to select the object of the command (step S4). If the object of the command should not be selected (step S3; NO), the CPU 8 judges whether the selected command is a definitive command that is executed when selected by the player (step S5). If the selected command is not the definitive command (step S5; NO), the processing returns to step S1 so that the player should select the lower-order command (i.e., sub-command). When the definitive command is selected (step S5; YES), the CPU 6 performs the selected command (step S6).

Figure 5:
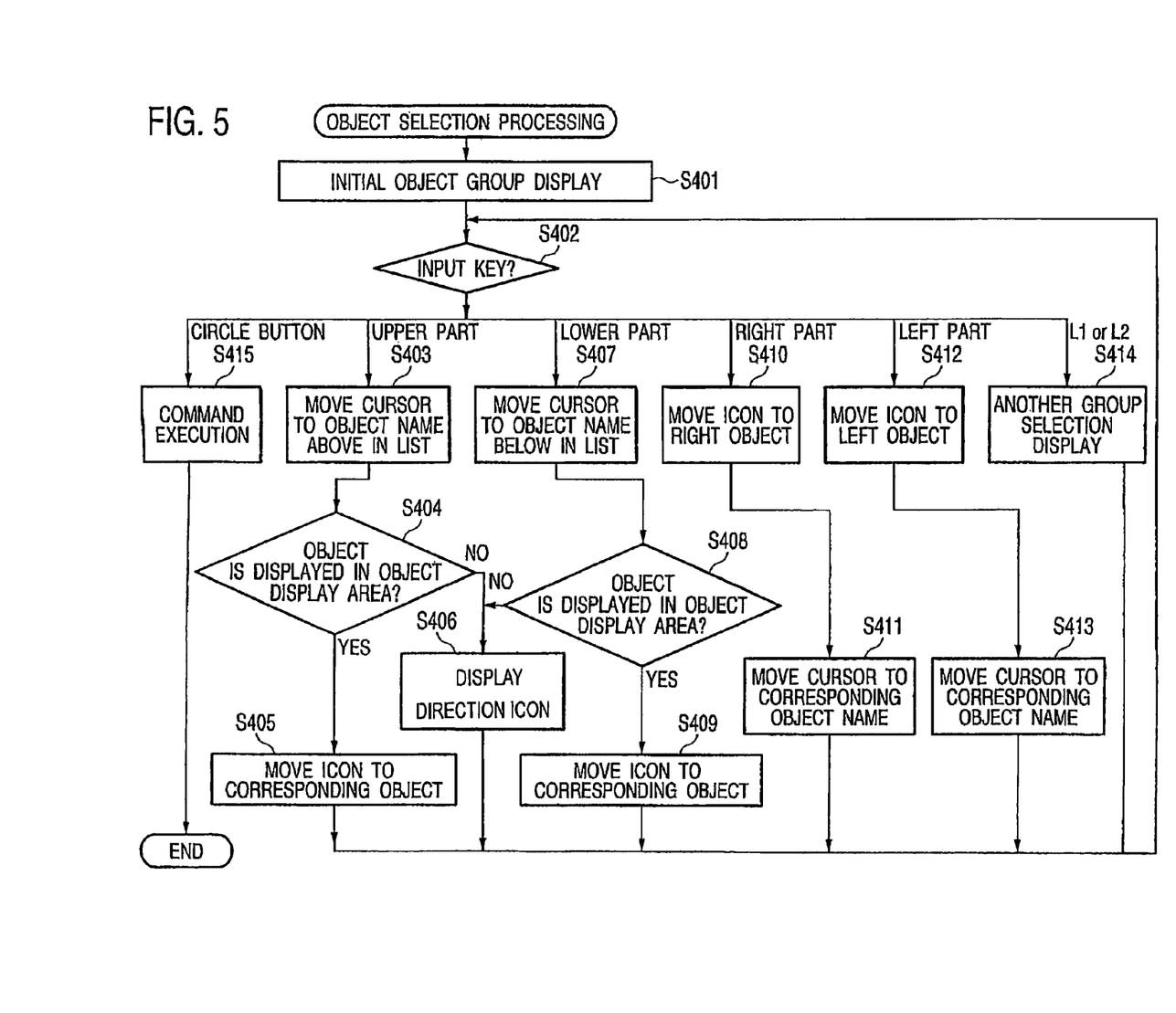
FIG. 5 is a flowchart showing a processing procedure for selecting an object according to an embodiment of the present invention.

The object selection processing (step S4) is performed in accordance with a flowchart of FIG. 5. Firstly, an initial object group display processing is executed at step S401. If a cure magic command such as "KEAL", "KEARUGA" and the like, which command is intended for the PCs, is judged at step S3, the PC group is displayed because the initial group of the cure magic command is the PC group. As a result of the initial group display processing at step S401, a list 512 is displayed on the display screen 51 (FIG. 6), while being separated from an object display area 511 where the PCs 1-3 and ECs 1-2 are displayed. The character names "PC 1", "PC 2" and "PC 3" of the PC group are displayed in the list 512. Furthermore, a cursor C is displayed at an initial position to point to the character name "PC 1". In addition, an icon I is displayed at an initial position to point to the player character PC 1.

Next, the CPU 8 judges the type of the input key operated by the player with the controller 3 (step S402). If the CPU 8 judges that the upper part 31U of the cross key 31 is operated, the cursor C is moved to the character name above the initial point in the list 512 (step S403). Then, the CPU 8 judges whether the character corresponding to the character name pointed to by the cursor is displayed in the object display area 511 (step S404). If the CPU 8 judges that the corresponding character is displayed in the object display area 511 (step S404; YES), the icon I is moved to the corresponding character (step S405). If the corresponding character is not displayed in the object display area (step S404; NO), another icon indicating the direction where the corresponding character exists is displayed (step S406).

Figure 6:
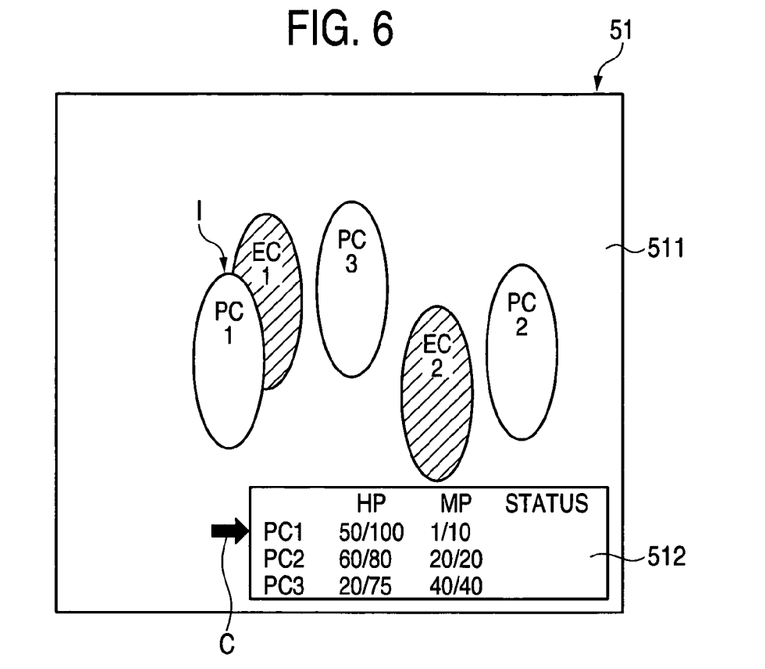
FIG. 6 is a view showing an example of a display screen according to an embodiment of the invention.
Figure 7:
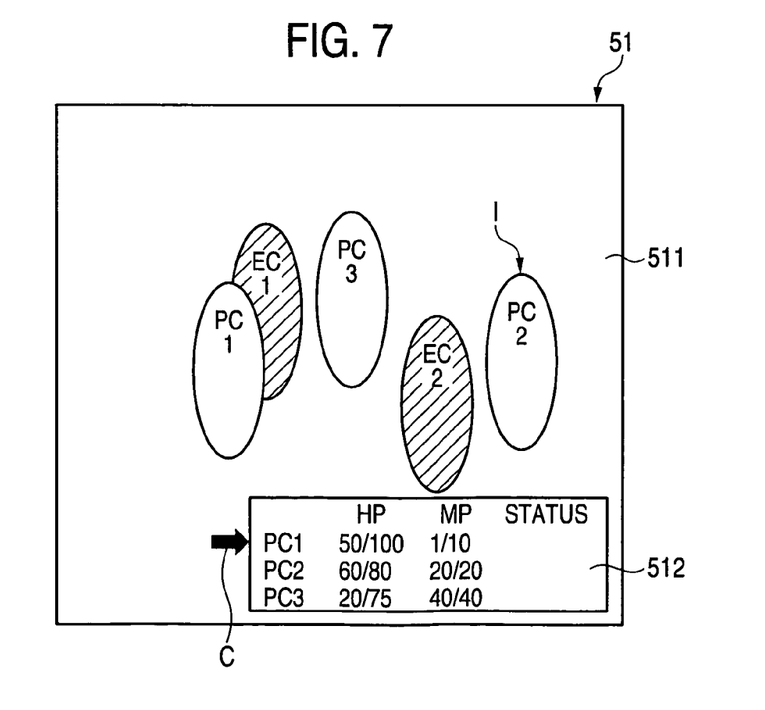
FIG. 7 is a view showing an example of a display screen according to an embodiment of the invention.

On the other hand, when the CPU 8 judges that the lower part 31D of the cross key 31 is operated at step S402, the cursor C is moved to the character name below the initial position (step S407). That is, when the player operates the lower part 31D of the cross key under the situation where the cursor C points to the character name "PC 1" as shown in FIG. 6, the cursor C moves to the character name "PC 2" as shown in FIG. 7.

Then, the CPU 8 judges whether the character corresponding to the character name pointed to by the cursor C is displayed in the object display area (step S408). When the corresponding character is displayed in the object display area (step S408: YES), the icon I is moved to the corresponding character (step S409). That is, the icon I is moved to the character "PC 2" as shown in FIG. 7.

Figure 8:
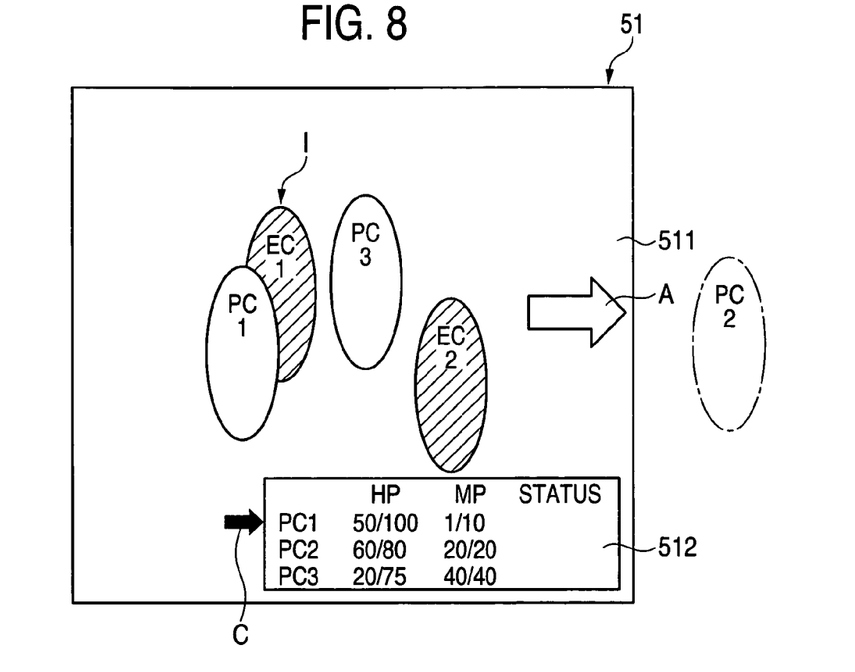
FIG. 8 is a view showing an example of a display screen according to an embodiment of the invention.

However, when the character corresponding to the character name pointed to by the cursor C is not displayed in the object display area 511 (step S408: NO), an icon indicating the direction where the corresponding character exists is displayed (step S406). That is, as shown in FIG. 8, when the cursor C is moved to the character name "PC 2" in accordance with the player's operation to the lower part 31D of the cross key 31, and the player character PC 2 is not displayed in the object display area 511, the icon I is not able to point to the player character PC 2. Thus, as shown in FIG. 8, another icon, for example, an arrow A pointing in the direction where the player character PC 2 virtually exists is displayed. Consequently, the player is able to recognize that the character corresponding to the character name that the player selects is not present in the object display area 511, and further recognizes the direction where the corresponding player character virtually exists in the game.

Figure 9:
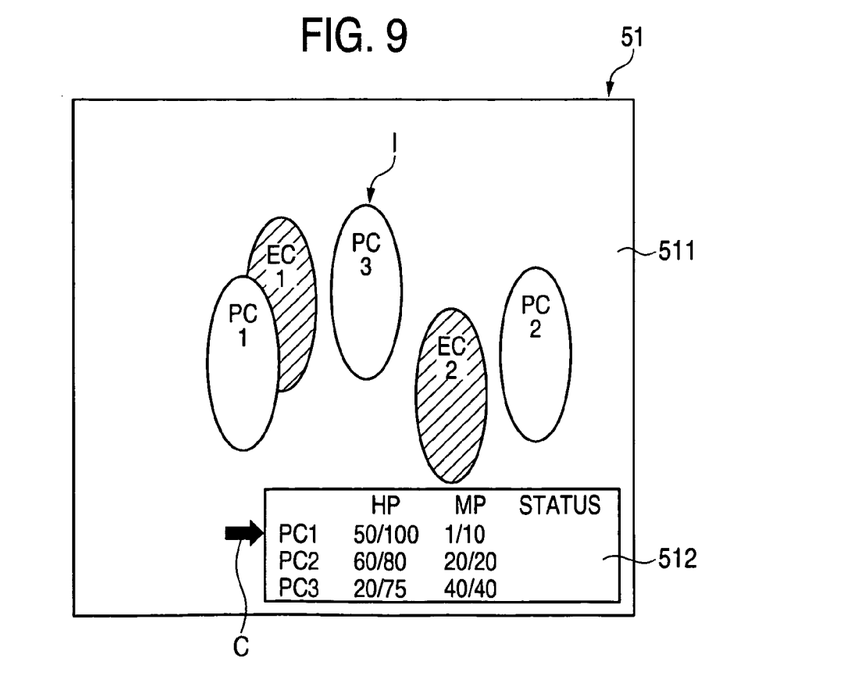
FIG. 9 is a view showing an example of a display screen according to an embodiment of the invention.

On the other hand, when the CPU 8 judges at step S402 that the right part 31R of the cross key 31 is operated by the player, the CPU 8 moves the icon I to the right (step S410). That is, when the player operates the right part 31R of the cross key 31 under the situation where the icon I points to the player character PC 1 as shown in FIG. 6, the icon moves to the position pointing the player character PC 3 on the right side of the player character PC 1, as shown in FIG. 9. Furthermore, the cursor C is moved to the corresponding character name in the list 512 (step S411). That is, the cursor C is moved to the position pointing to the player character name "PC 3" as shown in FIG. 9.

When the CPU 8 judges that the player operates the left part 31L of the cross key 31, the CPU 8 moves the icon I to the left (step S412). In addition, the CPU moves the cursor C to the corresponding character name (step S413).

Figure 10:
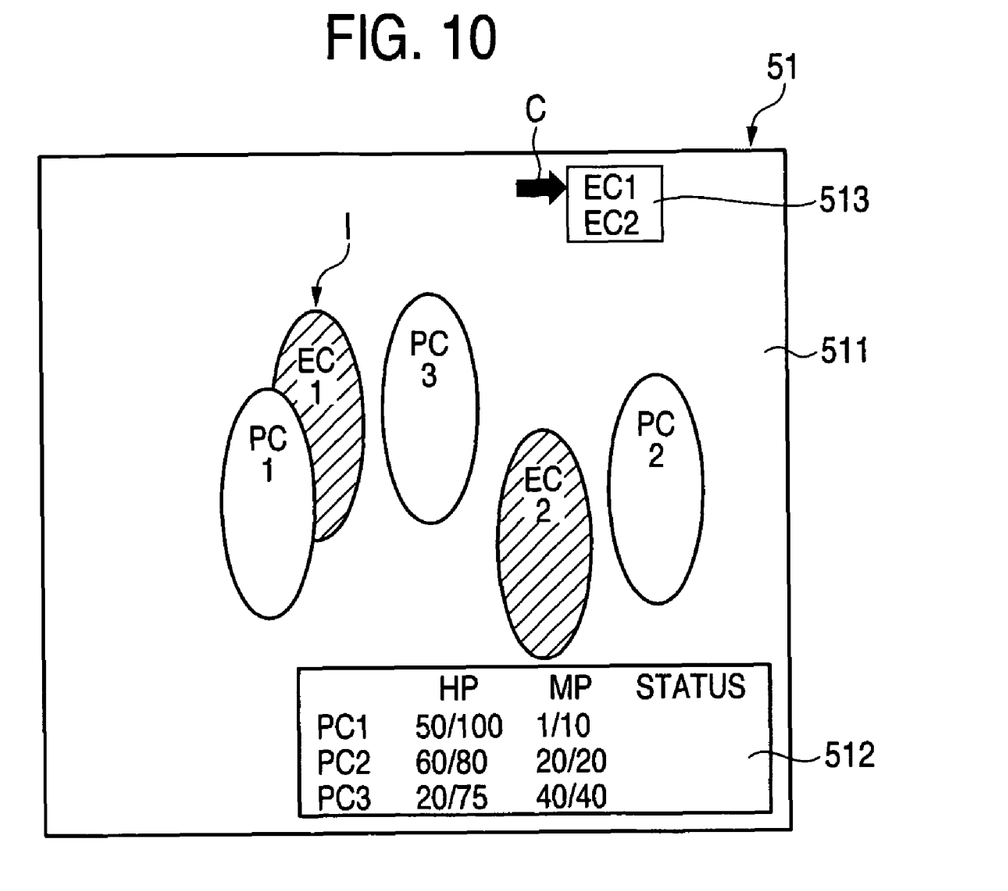
FIG. 10 is a view showing an example of a display screen according to an embodiment of the invention.

On the other hand, when the CPU 8 judges that the player operates the L1 button 40 or the L2 button 42, the CPU 8 switches the display for selecting another group (step S414). That is, at step 414, the CPU 8 displays a list 513 in addition of the list 512 as shown in FIG. 10. The enemy character names "EC 1" and "EC 2" belonging to the EC group are displayed in the list 513. Furthermore, the cursor C is displayed at an initial position pointing to the enemy character name "EC 1". The icon I is displayed at an initial position pointing to the enemy character "EC 1". Then, the processing returns back to step S402, and the selection processing as described above is executed with respect to the EC group.

When the CPU 8 judges at step S 402 that the player operates the circle button 32, the selection of the character name and the character pointed to by the cursor C and the icon I, respectively, are determined. Then, the command selected at step S2 in the flowchart of FIG. 4 is executed at step S415 and the processing ends.

Although the cursor C, the icon I and the arrow A are used in this embodiment, the change of display color and the like may be used as the display variation. Furthermore, the direction where the character exists may be displayed in the form of letters, for example, instead of the arrow.

In this embodiment, the character name is selected in the list in accordance with operation of the upper and lower parts of the cross key, while the character is selected in the object display area in accordance with the operation of the left and right parts of the cross key. However, the present invention is not limited to this embodiment, and the character name may be selected in accordance with the operation of the left and right parts while the character may be selected in accordance with the upper and lower parts. In this case, the character names may be displayed side by side in the list. The character may be selected in the object display area in accordance with the direction on the screen corresponding to the player's operation.

Furthermore, although the character is selected using the cross key in this embodiment, the joysticks 37 may be used for the selection. In this case, the character name is selected in the list in accordance with the vertical direction of the operation of the joysticks 37, and the character is selected in the object display area in accordance with the right and left directions of the operation of the joysticks 37.

Furthermore, although the home-use game device is used as a platform in this embodiment, the present invention may be implemented using general-purpose computers such as personal computers and the like or arcade game machines.

Furthermore, in this embodiment, data or programs for implementing the present invention are stored in the DVD-ROM, and the DVD-ROM is used as a recording medium. However, a compact disc, other computer-readable magnetic or optical recording mediums, or a semiconductor memory may be used as the recording medium. Also, the program or data for implementing the present invention may be provided by pre-installing them in a storage apparatus of a game device or a computer.

Furthermore, the program or data for implementing the present invention may be downloaded to the HDD 10 by the interface portion 11 from other devices on the network 17 connected to the interface portion via the communications line 16. Also, the program or the data may be stored in memories of the other devices on the communications line 16. Then, the program or the data may be sequentially stored in the RAM 9 via the communications line 16 when needed.

In addition, the program or the data for implementing the present invention may be provided as a computer data signal superimposed on a carrier wave from other devices on the network 17. In this case, the computer interface 15 requests the other devices on the network 17 to transmit the computer data signal, and the RAM 9 stores the transmitted computer data. Thus, the present invention may be implemented by the game apparatus 1 using the program or the data stored in the RAM 9 as above.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A game apparatus, comprising:
    a first input system that receives a first operation input by a user;
    a second input system that receives a second operation input by the user;
    a third input system that receives a third operation input by the user;
    a memory that stores, in association with object names, data of positions at which objects are in a three-dimensional coordinate system and data of positions at which the objects are in a screen coordinate system, the objects being divided into a plurality of groups depending on types, the plurality of groups including at least a first group including a user controlled character and friendly objects and a second group including enemy objects;
    a group selection controller that selects a selected group of the plurality of groups in response to the third operation input to the third input system;
    a list display controller that displays a list of selectable object names of selectable objects included in the selected group to be selected by the user on a display system;
    an object display controller that displays an object display area where at least one of the objects is displayed on the display system;
    a first selection display controller that selects, from the selectable object names of the selectable objects included in the selected group and displayed in the list, a selected object name in response to the first operation input to the first input system, and displays an associated object corresponding to the selected object name in a form indicating the associated object is selected when the associated object is displayed in the object display area;
    a second selection display controller that selects, from the selectable objects included in the selected group and displayed in the object display area, a selected object in response to the second operation input to the second input system, and displays an associated object name corresponding to the selected object and displayed in the list in a form indicating the associated object name is selected; and
    a determiner that determines whether the associated object corresponding to the selected object name is displayed in the object display area based on the data stored in the memory,
    wherein the object display area is distinct from the list of selectable object names,
    wherein the first selection display controller and the second selection display controller control the placement of an icon that points, in the object display area, to one of the selected object and the associated object corresponding to the selected object name,
    wherein the first selection display controller and the second selection display controller control the placement of a cursor that points, in the list, to one of the selected object name and the associated object name corresponding to the selected object,
    wherein the icon points in the direction of the associated object corresponding to the selected object name, based on the data stored in the memory, when the determiner determines that the associated object is not displayed in the object display area, and
    wherein the third operation input by the user to the third input system specifies the selected group from among the plurality of groups, the group selection controller directly selects the selected group in response to the third operation, and the objects and object names associated with the selected group are selectable via the first operation and the second operation.

2. The game apparatus according to claim 1, wherein the first selection display controller selects the selected object name in the list based upon a display order in response to the first operation input to the first input system.

3. The game apparatus according to claim 1, wherein the second selection display controller selects the selected object based upon a positional relationship between the selectable objects displayed in the object display area.

4. The game apparatus according to claim 1, wherein
    the first input system is positioned on a first line having two first input ends, and receives a first direction corresponding to one of the two first input ends operated by the user,
    the first selection display controller selects the selected object name based upon the first direction received by the first input system, the second input system is positioned on a second line extending in directions different from the first line and having two second input ends, and receives a second direction corresponding to one of the two second input ends operated by the user, and the second selection display controller selects the selected object based upon the second direction received by the second input system.

5. The game apparatus according to claim 4, wherein the first and second lines intersect at right angles to one another.

6. The game apparatus according to claim 1, wherein the first and second input systems are configured by an operating part positioned within a range in which the user can operate the operating part with a predetermined finger of one hand when the hand is positioned at a predetermined position.

7. The game apparatus according to claim 1, further comprising:

an initial group decider that decides an initial group in response to a command selected by the user, wherein the group selection controller changes the initial group to the new selected group in response to the third operation input by the user to the third input system.

8. An object selecting method executed by a computer of a game apparatus including a first input system, a second input system, and a third input system that receive, respectively, a first operation, a second operation, and a third operation each input by a user, the game apparatus further including a memory that stores, in association with object names, data of positions at which objects are in a three-dimensional coordinate system and data of positions at which the objects are in a screen coordinate system, the objects being divided into a plurality of groups depending on types, the plurality of groups including at least a first group including a user controlled character and friendly objects and a second group including enemy objects, the method comprising:

selecting a selected group of the plurality of groups in response to the third operation input to the third input system;

displaying a list containing selectable object names of selectable objects included in the selected group to be selected by the user on a predetermined display system;

displaying an object display area where at least one of the objects is displayed on the display system;

selecting, from the selectable object names of the selectable objects included in the selected group and displayed in the list, a selected object name in response to the first operation input to the first input system;

displaying an associated object corresponding to the selected object name in a form indicating the associated object is selected when the associated object is displayed in the object display area;

selecting, from the selectable objects included in the selected group and displayed in the object display area, a selected object in response to the second operation input to the second input system;

displaying an associated object name corresponding to the selected object in the list in a form indicating the associated object name is selected; and determining whether the associated object corresponding to the selected object name is displayed in the object display area based on the data stored in the memory, wherein the object display area is distinct from the list of selectable object names, wherein the placement of an icon that points to one of the selected object and the associated object corresponding to the selected object name is controlled by the selection of the selected object name in the list of selectable object names and by the selection of the selected object displayed in the object display area, wherein the placement of a cursor that points to one of the selected object name and the associated object name corresponding to the selected object is controlled by the selection of the selected object name in the list of selectable object names and by the selection of the selected object displayed in the object display area, wherein the icon points in the direction of the associated object corresponding to the selected object name, based on the data stored in the memory, when the determining determines that the associated object is not displayed in the object display area, wherein the third operation input by the user to the third input system specifies the selected group from among the plurality of groups, the selected group is directly selected in response to the third operation, and the objects and object names associated with the selected group are selectable via the first operation and the second operation.

9. The object selecting method according to claim 8, wherein the selected object name is selected based upon a display order in response to the first operation input to the first input system.

10. The object selecting method according to claim 8, wherein the selected object is selected based upon a positional relationship between the selectable objects displayed in the object display area.

11. The object selecting method according to claim 8, wherein the first input system is positioned on a first line having two first input ends, and receives a first direction corresponding to one of the first input ends operated by the user, the selected object name is selected based upon the first direction received by the first input system, the second input system is positioned on a second line extending in directions different from the first line and having two second input ends, and receives a second direction corresponding to one of the second input ends operated by the user, and the selected object is selected based upon the second direction received by the second input system.

12. The object selecting method according to claim 11, wherein the first and second lines intersect at right angles to one another.

13. The object selecting method according to claim 8, wherein the first and second input systems are configured by an operating part positioned within a range in which the user can, operate the operating part with a predetermined finger of one hand when the hand is positioned at a predetermined position.

14. The object selecting method according to claim 8, further comprising:

deciding an initial group in response to a command selected by the user, wherein the initial group is changed to the selected group in response to the third operation input by the user to the third input system.

15. A non-transitory recording medium on which is recorded a program executed by a computer of a game apparatus including a first input system, a second input system, and a third input system that receive, respectively, a first operation, a second operation, and a third operation input by a user, the game apparatus further including a memory that stores, in association with object names, data of positions at which objects are in a three-dimensional coordinate system and data of positions at which the objects are in a screen coordinate system, the objects being divided into a plurality of groups depending on types, the plurality of groups including at least a first group including a user controlled character and friendly objects and a second group including enemy objects, the program causing the computer to execute:

selecting a selected group of the plurality of groups in response to the third operation input to the third input system;

displaying a list containing selectable object names of selectable objects included in the selected group to be selected by the user on a predetermined display system;

displaying an object display area where at least one of the objects is displayed on the display system;

selecting, from the selectable object names of the selectable objects included in the selected group and displayed in the list, a selected object name in response to the first operation input to the first input system;

displaying an associated object corresponding to the selected object name in a form indicating the associated object is selected when the associated object is displayed in the object display area;

selecting, from the selectable objects included in the selected group and displayed in the object display area, a selected object in response to the second operation input to the second input system;

displaying an associated object name corresponding to the selected object in the list in a form indicating the associated object name is selected; and determining whether the associated object corresponding to the selected object name is displayed in the object display area based on the data stored in the memory, wherein the object display area is distinct from the list of selectable object names, wherein the placement of an icon that points to one of the selected object and the associated object corresponding to the selected object name is controlled by the selection of the selected object name in the list of selectable object names and by the selection of the selected object displayed in the object display area, wherein the placement of a cursor that points to one of the selected object name and the associated object name corresponding to the selected object is controlled by the selection of the selected object name in the list of selectable object names and by the selection of the selected object displayed in the object display area, wherein the icon points in the direction of the associated object corresponding to the selected object name, based on the data stored in the memory, when the determining determines that the associated object is not displayed in the object display area, wherein the third operation input by the user to the third input system specifies the selected group from among the plurality of groups, the selected group is directly selected in response to the third operation, and the objects and object names associated with the selected group are selectable via the first operation and the second operation.

16. The non-transitory recording medium according to claim 15, wherein the selected object name is selected based upon a display order in response to the first operation input to the first input system.

17. The non-transitory recording medium according to claim 15, wherein the selected object is selected based upon a positional relationship between the selectable objects displayed in the object display area.

18. The non-transitory recording medium according to claim 15, wherein the first input system is positioned on a first line having two first input ends, and receives a first direction corresponding to one of the first input ends operated by the user, the selected object name is selected based upon the first direction received by the first input system, the second input system is positioned on a second line extending in directions different from the first line and having two second input ends, and receives a second direction corresponding to one of the second input ends operated by the user, and the selected object is selected based upon the second direction received by the second input system.

19. The non-transitory recording medium according to claim 18, wherein the first and second lines intersect at right angles to one another.

20. The non-transitory recording medium according to claim 15, wherein the first and second input systems are configured by an operating part positioned within a range in which the user can operate the operating part with a predetermined finger of one hand when the hand is positioned at a predetermined position.

21. The non-transitory recording medium according to claim 15, wherein the program further causes the computer to execute:

deciding an initial group in response to a command selected by the user, wherein the initial group is changed to the selected group in response to the third operation input by the user to the third input system.

* * * * *